United States Patent
Bagchi et al.

(10) Patent No.: US 10,776,339 B2
(45) Date of Patent: *Sep. 15, 2020

(54) INTELLIGENT LOG GAP DETECTION TO PREVENT UNNECESSARY BACKUP PROMOTION

(71) Applicant: EMC IP Holding Company LLC, Hopkinton, MA (US)

(72) Inventors: Krishnendu Bagchi, Bangalore (IN); Shelesh Chopra, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/041,954

(22) Filed: Jul. 23, 2018

(65) Prior Publication Data

US 2020/0026615 A1 Jan. 23, 2020

(51) Int. Cl.
*G06F 16/23* (2019.01)
*G06F 16/27* (2019.01)

(52) U.S. Cl.
CPC .............. *G06F 16/23* (2019.01); *G06F 16/27* (2019.01); *G06F 16/278* (2019.01)

(58) Field of Classification Search
CPC ............. G06F 16/2358; G06F 16/1858; G06F 16/219; G06F 16/23; G06F 16/2365; G06F 16/2379; G06F 16/273
USPC .................................................. 707/645, 646
See application file for complete search history.

(56) References Cited

U.S. PATENT DOCUMENTS

| 5,481,694 | A | 1/1996 | Chao et al. | |
|---|---|---|---|---|
| 9,135,016 | B1* | 9/2015 | O'Connell | G06F 16/1844 |
| 9,223,843 | B1* | 12/2015 | Madhavarapu | G06F 16/2365 |
| 2001/0013102 | A1* | 8/2001 | Tsuchiya | G06F 11/1464 714/4.5 |
| 2005/0273650 | A1* | 12/2005 | Tsou | G06F 11/1456 714/6.12 |
| 2009/0024815 | A1 | 1/2009 | Iwamura et al. | |
| 2016/0077925 | A1* | 3/2016 | Tekade | G06F 11/1461 707/654 |

(Continued)

OTHER PUBLICATIONS

Pawankumawat; "Avamar: AVSQL Error 15762: Skipping Incremental Backup After Full for (Local)/Databasename Database. Error: Unable to Get Log Gap Detection Data"; Dell Inc.; Feb. 18, 2015 (https://community.emc.com/docs/DOC-42408).

(Continued)

*Primary Examiner* — James Trujillo
*Assistant Examiner* — Fariborz Khoshnoodi
(74) *Attorney, Agent, or Firm* — Chamberlain, Hrdlicka, White, Williams & Aughtry

(57) ABSTRACT

An intelligent log gap detection to prevent unnecessary backup promotion. Specifically, the method and system disclosed herein entail determining whether to pursue a requested database backup type or to promote the requested database backup type to another database backup type, in order to preclude data loss across high availability databases. When a decision is made to pursue the requested database backup type, storage space, intended for backup consolidation on a backup system or media, is saved for future backup requests rather than being consumed as would be the case would the requested database backup type had been promoted.

13 Claims, 12 Drawing Sheets

(56) References Cited

U.S. PATENT DOCUMENTS

2017/0060699 A1\* 3/2017 Hohl ................. G06F 16/27
2017/0116220 A1\* 4/2017 Wong ............... G06F 11/1471

OTHER PUBLICATIONS

Shawn McGehee; "SQL Server Backup and Restore"; Simple Talk Publishing; ISBN 978-1-906434-85-4; Apr. 2012.

\* cited by examiner

INTELLIGENT LOG GAP DETECTION TO PREVENT UNNECESSARY BACKUP PROMOTION

BACKGROUND

Often, multiple databases are configured to fail over together, to ensure high availability of the consolidated information. Also, at times, disaster recovery for these databases are managed not by a sole backup platform, but various backup platforms, which do not cross-share information. As it stands, being unaware of the others' actions, gaps in the backup chain for these databases are prevalent, leading to data loss upon restoration of the databases.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to intelligent log gap detection to prevent unnecessary backup promotion. Specifically, one or more embodiments of the invention entails determining whether to pursue a requested database backup type or to promote the requested database backup type to another database backup type, in order to preclude data loss across high availability databases. When a decision is made to pursue the requested database backup type, storage space, intended for backup consolidation on a backup system or media, is saved for future backup requests rather than being consumed as would be the case would the requested database backup type had been promoted.

Figure 1:
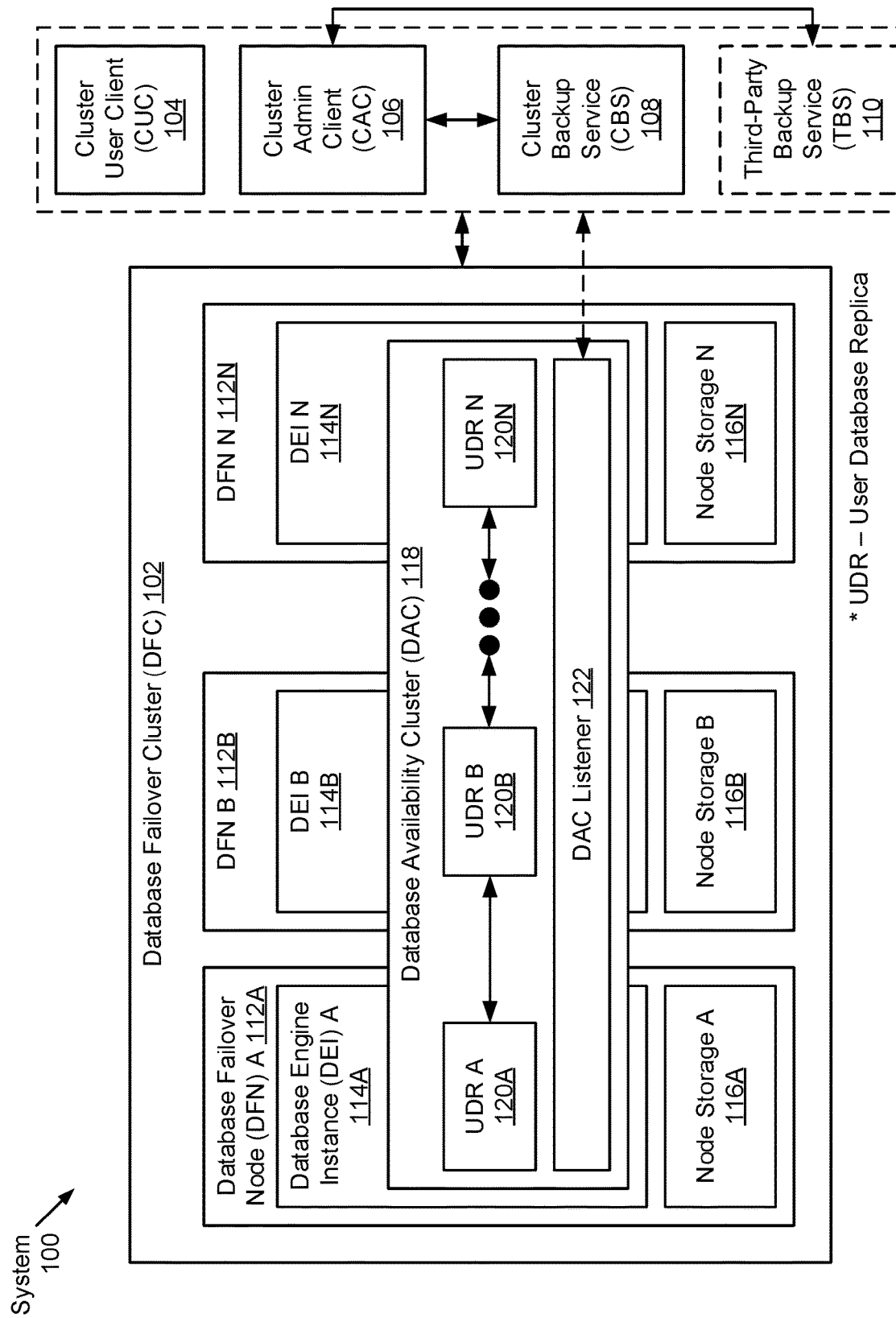
FIG. 1 shows a system in accordance with one or more embodiments of the invention.

FIG. 1 shows a system in accordance with one or more embodiments of the invention. The system (100) may include a database failover cluster (DFC) (102), one or more cluster user clients (CUC) (104), one or more cluster admin clients (CAC) (106), a cluster backup service (CBS) (108), and, optionally, one or more third-party backup services (TBS) (110). Each of these components is described below.

In one embodiment of the invention, the above-mentioned components may be directly or indirectly connected to one another through a network (not shown) (e.g., a local area network (LAN), a wide area network (WAN) such as the Internet, a mobile network, or any other network). The network may be implemented using any combination of wired and/or wireless connections. In embodiments in which the above-mentioned components are indirectly connected, there may be other networking components or systems (e.g., switches, routers, gateways, etc.) that facilitate communications, information exchange, and/or resource sharing between the various components. Further, the above-mentioned components may communicate with one another using any combination of wired and/or wireless communication protocols.

In one embodiment of the invention, the DFC (102) may refer to a group of linked nodes—i.e., database failover nodes (DFNs) (112A-112N) (described below)—that work together to maintain high availability (or minimize downtime) of one or more applications and/or services. The DFC (102) may achieve the maintenance of high availability by distributing any workload (i.e., applications and/or services) across or among the various DFNs (112A-112N) such that, in the event that any one or more DFNs (112A-112N) go offline, the workload may be subsumed by, and therefore may remain available on, other DFNs (112A-122N) of the DFC (102). Further, reasons for which a DFN (112A-112N) may go offline include, but are not limited to, scheduled maintenance, unexpected power outages, and failure events induced through, for example, hardware failure, data corruption, and other anomalies caused by cyber security attacks and/or threats. Moreover, the various DFNs (112A-112N) in the DFC (102) may reside in different physical (or geographical) locations in order to mitigate the effects of unexpected power outages and failure (or failover) events. By way of an example, the DFC (102) may represent an AlwaysOn Failover Cluster or a Windows Server Failover Cluster (WSFC), which may each encompass multiple Structured Query Language (SQL) servers.

Figure 6:
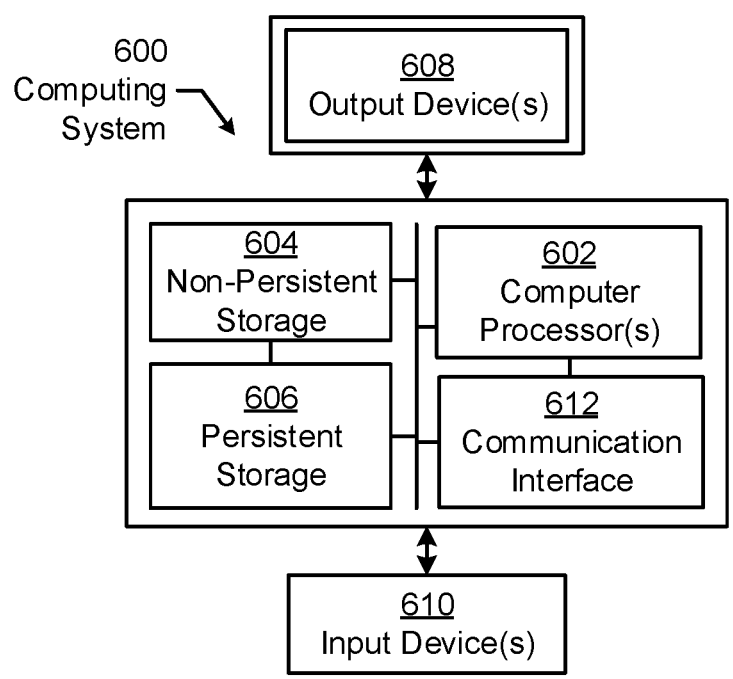
FIG. 6 shows a computing system in accordance with one or more embodiments of the invention.

In one embodiment of the invention, a DFN (112A-112N) may be a physical appliance—e.g., a server or any computing system similar to the exemplary computing system shown in FIG. 6. Further, each DFN (112A-112N) may include functionality to maintain an awareness of the status of every other DFN (112A-112N) in the DFC (102). By way of an example, this awareness may be implemented through the periodic issuance of heartbeat protocol messages between DFNs (112A-112N), which serve to indicate whether any particular DFN (112A-112N) may be operating normally or, for some reason, may be offline. In the occurrence of an offline event on one or more DFNs (112A-112N), as mentioned above, the remaining (operably normal) DFNs (112A-112N) may assume the responsibilities (e.g., provides the applications and/or services) of the offline DFNs (112A-112N) without, at least while minimizing, downtime experienced by the end users (i.e., operators of one or more CUCs (104)) of the DFC (102).

In one embodiment of the invention, the various DFNs (112A-112N) in the DFC (102) may operate under an active-standby (or active-passive) failover configuration. That is, under the aforementioned failover configuration, one of the DFNs (e.g., 112A) of the DFC (102) may play the role of the active (or primary) node in the DFC (102), whereas the remaining one or more DFNs (e.g., 112B-112N) may each play the role of a standby (or secondary) node in the DFC (102). With respect to roles, the active node may refer to a node to which client traffic (i.e., network traffic originating from one or more CUCs (104)) may currently be directed. The active node may also refer to the node whereon a current primary user database replica (UDR) (120A-120N) (described below) resides. On the other hand, a standby node may refer to a node that may not be currently interacting with one or more CUCs (104) and/or whereon a current secondary UDR (120A-120N) may reside.

In one embodiment of the invention, each DFN (112A-112N) may host a database engine instance (DEI) (114A-114N) thereon. A DEI (114A-114N) may refer to a computer program or process (i.e., an instance of a computer program) tasked with executing an operating system (OS) service. Specifically, a DEI (114A-114N) include functionality to manage one or more user databases (i.e., one or more UDRs (120A-120N)). Further, a DEI (114A-114N) may operate as a service that handles all input-output (IO) requests to interact with the data in any of the user databases managed by the DEI (114A-114N). The IO requests may represent at least a portion of client traffic submitted by one or more CUCs (104). By way of an example, a DEI (114A-114N) may correlate to a SQL Server Instance.

In one embodiment of the invention, each DFN (112A-112N) may include a node storage (116A-116N). A node storage (116A-116N) may represent one or more physical storage devices and/or media on which various forms of information, pertinent to a respective DFN (112A-112N), may be consolidated. The one or more physical storage devices and/or media may or may not be of the same type. Further, information consolidated in a node storage (116A-116N) may be arranged using any storage mechanism (e.g., a filesystem, a collection of tables or records, etc.). Moreover, a node storage (116A-116N) may host a respective UDR (120A-120N) (described below). In one embodiment of the invention, a node storage (116A-116N) may be implemented using persistent storage (i.e., non-volatile) storage devices and/or media. Examples of persistent storage include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage device and/or media defined as non-volatile Storage Class Memory (SCM).

In one embodiment of the invention, each DFN (112A-112N) may further include a UDR (120A-120N), which may encompass a local copy of one or more user databases maintained across the DFC (102). Substantively, a UDR (120A-120N) may be a storage system or media for consolidating various forms of information pertinent to one or more end users (i.e., operators of the one or more CUCs (104)). Information consolidated in a UDR (120A-120N) may be partitioned into either a data files segment (not shown) or a log files segment (not shown). Information residing in the data files segment may include, for example, data and objects such as tables, indexes, stored procedures, and views. Further, any information written to a UDR (120A-120N), by one or more end users, may be retained in the data files segment.

On the other hand, in one embodiment of the invention, information residing in the log files segment may include, for example, a transaction log and any other metadata that may facilitate the recovery of any and all transactions in a UDR (120A-120N). A transaction log may refer to a data object or structure that records all transactions, and database changes made by each transaction, pertinent to the UDR (120A-120N) within which the transaction log resides. Further, each transaction or record in the transaction log may be identified through a unique log sequence number (LSN). A LSN may represent the offset, in bytes, of the transaction log record (that which the LSN identifies) from the beginning of a database log file. Furthermore, LSNs may be ordered in such a way that changes denoted by a transaction identified by a greater LSN occurred after the changes denoted by another transaction identified by a lesser LSN.

In one embodiment of the invention, the multiple UDRs (120A-120N) across the DFC (102) may collectively form a database availability cluster (DAC) (118). A DAC (118) may refer to a container for a set of databases that have been configured to failover together. That is, within a DAC (118), there may be one active (or primary) UDR (120A-120N) and one or more passive (or secondary) UDRs (120A-120N). Further, when online, the active UDR (120A-120N) may take ownership of information read therefrom and written thereto by one or more CUCs (104). However, when the active UDR (120A-120N) experiences failure, one of the one or more passive UDRs (120A-120N) may subsume the ownership of the information, thereby, becoming active. The active UDR (120A-120N), at any given time, thus operates in read-write (RW) mode, which grants the one or more CUCs (104) read and write access to the active UDR (120A-120N). On the other hand, the one or more passive UDRs (120A-120N), at any given time, operate in read-only (RO) mode, which grants the one or more CUCs (104) only read access to the one or more passive UDRs (120A-120N). By way of an example, the DAC (118) may represent an AlwaysOn Availability Group (AAG).

In one embodiment of the invention, the DAC (118) may further include a DAC listener (122). The DAC listener (122) may refer to a logical portal to which clients (e.g., CUCs (104) and/or CACs (106)) may connect in order to access the multiple UDRs (120A-120N) of the DAC (118).

To this end, the DAC listener (122) may be associated with a unique domain name service (DNS) name that serves as a virtual network name (VNN), one or more virtual Internet Protocol (VIP) addresses, and a transmission control protocol (TCP) port number. Substantively, a client may use DNS to resolve the VNN into the one or more VIP addresses. Thereafter, the client may attempt to connect to each of the VIP addresses until a connection request succeeds (i.e., thereby granting the client access to a UDR (120A-120N)) or until the connection requests time out.

In one embodiment of the invention, a CUC (104) may be any computing system operated by a user of the DFC (106). A user of the DFC (106) may refer to an individual, a group of individuals, or an entity for which the database(s) of the DFC (106) is/are intended; or whom accesses the database(s). Further, a CUC (104) may include functionality to: submit application programming interface (API) requests to the DFC (106), where the API requests may be directed to accessing (e.g., reading data from and/or writing data to) the database(s) of the DFC (106); and receive API responses, from the DFC (106), entailing, for example, queried information. One of ordinary skill will appreciate that a CUC (104) may perform other functionalities without departing from the scope of the invention. Examples of a CUC (104) include, but are not limited to, a desktop computer, a laptop computer, a tablet computer, a server, a mainframe, a smartphone, or any other computing system similar to the exemplary computing system shown in FIG. 6.

In one embodiment of the invention, a CAC (106) may be any computing system operated by an administrator of the DFC (106). An administrator of the DFC (106) may refer to an individual, a group of individuals, or an entity whom may be responsible for overseeing operations and maintenance pertinent to hardware, software, and/or firmware elements of the DFC (106). Further, a CAC (106) may include functionality to: submit database backup requests (described below) to the CBS (108), where the database backup requests may pertain to the performance of data backup operations on/of the active (or primary) UDR (120A-120N). One of ordinary skill will appreciate that a CAC (106) may perform other functionalities without departing from the scope of the invention. Examples of a CAC (106) include, but are not limited to, a desktop computer, a laptop computer, a tablet computer, a server, a mainframe, a smartphone, or any other computing system similar to the exemplary computing system shown in FIG. 6.

In one embodiment of the invention, the above-mentioned data backup operations may entail creating full database backups, differential database backups, and/or transaction log backups of at least the active/primary UDR (120A-120N) of the DAC (118). A full database backup may refer to the generation of a backup copy containing all data files and the transaction log (described above) residing on at least the active/primary UDR (120A-120N). A differential database backup may refer to the generation of a backup copy containing all changes made to at least the active/primary UDR (120A-120N) since the last full database backup, and changes to the transaction log, residing on at least the active/primary UDR (120A-120N). Meanwhile, a transaction log backup may refer to the generation of a backup copy containing all transaction log records that have been made between the last transaction log backup (or the first full database backup) and the last transaction log record that may be created upon completion of the data backup process.

In one embodiment of the invention, the CBS (108) may represent a platform for database backup and recovery that may service one or more DFNs (112A-112N) of the DFC (102). The CBS (108) may be implemented using one or more servers (not shown). Each server may be a physical server (i.e., in a datacenter) or a virtual server (i.e., residing in a cloud computing environment). In one embodiment of the invention, the CBS (108) may be implemented using one or more computing systems similar to the exemplary computing system shown in FIG. 6. Furthermore, the CBS (108) may include functionality to: maintain a cluster backup chain table (BCT) in accordance with embodiments of the invention (see e.g., FIGS. 2B and 4B); instruct cluster backup agents (CBAs) (not shown, described below) responsible for executing database backup and recovery operations on serviced DFNs (112A-112N); consolidate backup copies of the UDR (120A-120N) respective to serviced DFNs (112A-112N); and intelligently detect log gaps to ensure backup promotion in accordance with embodiments of the invention (see e.g., FIGS. 5A and 5B). The CBS (108) is described in further detail below with respect to FIG. 2A.

In one embodiment of the invention, a TBS (110) may refer to a third-party platform for database backup and recovery that may service zero or more DFNs (112A-112N) of the DFC (102). A TBS (110) may be implemented using one or more servers (not shown). Each server may be a physical server (i.e., in a datacenter) or a virtual server (i.e., residing in a cloud computing environment). In one embodiment of the invention, a TBS (110) may be implemented using one or more computing systems similar to the exemplary computing system shown in FIG. 6. Furthermore, a TBS (110) may include functionality to: instruct third-party backup agents (TBAs) (not shown, described below) responsible for executing database backup and recovery operations on serviced DFNs (112A-112N); and consolidate backup copies of the UDR (120A-120N) respective to serviced DFNs (112A-112N).

While FIG. 1 shows a configuration of components, other system configurations may be used without departing from the scope of the invention. For example, the DFC (102) (i.e., the various DFNs (112A-112N)) may host multiple DACs (118) (i.e., multiple sets of UDRs (120A-120N)).

Figure 2A:
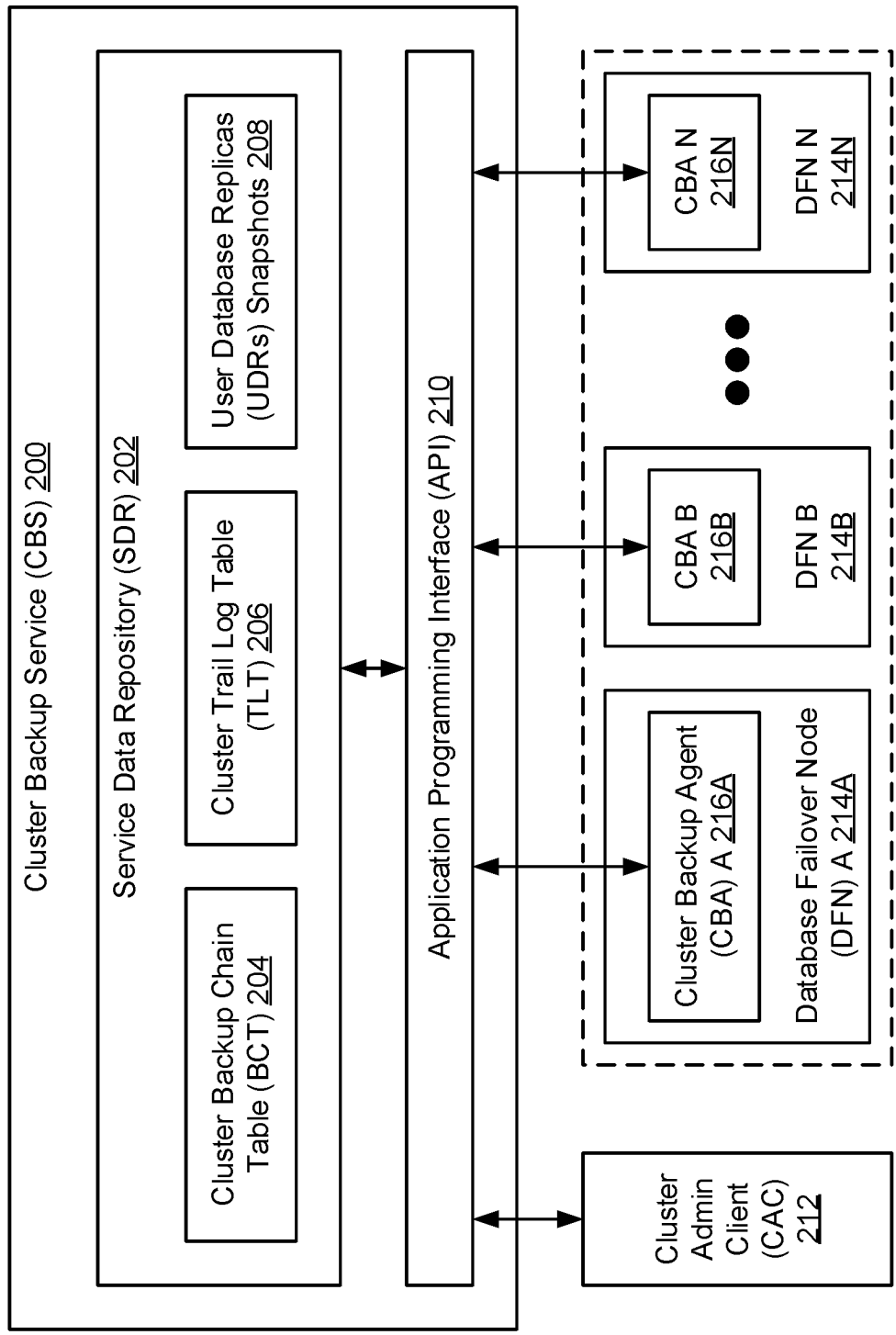
FIG. 2A shows a cluster backup service in accordance with one or more embodiments of the invention.

FIG. 2A shows a cluster backup service (CBS) in accordance with one or more embodiments of the invention. As described above, the CBS (200) may represent a platform for database backup and recovery that may service one or more database failover nodes (DFNs) of a database failover cluster (DFC) (see e.g., FIG. 1). The CBS (200) may include a service data repository (SDR) (202) operatively connected to an application programming interface (API) (210). Each of these components is described below.

In one embodiment of the invention, the SDR (202) may be a storage system or media for consolidating at least a cluster backup chain table (BCT) (204), a cluster trail log table (TLT) (206), and snapshots (i.e., backup copies) pertaining to one or more user database replicas (UDRs) (208). One of ordinary skill will appreciate that the SDR (202) may consolidate other information without departing from the scope of the invention. Further, the SDR (202) may be implemented across one or more physical and/or virtual storage units or devices, which may or may not be of the same type or co-located in a same computing system. In one embodiment of the invention, the SDR (202) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST- MRAM), Phase Change Memory (PCM), or any other storage media defined as non-volatile Storage Class Memory (SCM).

In one embodiment of the invention, the cluster BCT (204) may represent a data object or structure for storing database backup chains pertinent to all databases (i.e., UDRs) across a database availability cluster (DAC) (see e.g., FIG. 1). A database backup chain, for a given database, may refer to a sequence of database backups that records the appropriate order in which initial information and changes to the given database were consolidated. Restoration of a given database without experiencing data loss must therefore follow the sequence conveyed through the database backup chain. Further, each database backup recorded in a database backup chain may represent a full database backup, a differential database backup, or a transaction log backup of the given database associated with the database backup chain. The first database backup recorded in each database backup chain may always be a full database backup. The cluster BCT (204) is described in further detail below with respect to FIG. 2B.

In one embodiment of the invention, the cluster TLT (206) may represent a data object or structure for tracking the detection of log gaps and ensuing database backup promotions across a DAC (see e.g., FIG. 1). A log gap may represent a break in the database backup chain for a database, or a set of databases such as the DAC. Further, log gaps often infer the potential for data loss. One way to remedy log gaps, and thus avert data loss, includes promoting differential database or transaction log backups, when requested, to full database backups. Full database backups replicate and consolidate all data, log information, and metadata pertinent to a database, thereby preserving all state (including changes) associated with the database. In one embodiment of the invention, the information tracked in the cluster TLT (206) may be used for analytic and/or reporting purposes. For example, the tracked information (described below) may be analyzed to identify which one or more databases across the DAC is/are more susceptible to log gaps. By way of another example, the tracked information may be used to alert DFC administrators to the detection of log gaps, whom may move to schedule the performance of full database backups based on the provided notifications. The cluster TLT (206) is described in further detail below with respect to FIG. 2C.

In one embodiment of the invention, a UDR snapshot (208) may refer to a backup copy of a UDR (i.e., a database). The backup copy may entail a full database backup, a differential database backup, or a transaction log backup. A full database backup may replicate all data files and the transaction log (described above) of the database. A differential database backup may replicate all changes made to the database since the last full database backup, as well as changes since then made to the transaction log of the database. Meanwhile, a transaction log backup may replicate all transaction log records that have been made between the last transaction log backup (or the first full database backup) and the last transaction log record that may be created upon completion of the database backup process. Moreover, the SDR (202) may only consolidate UDR snapshots (208) pertaining to the one or more UDRs residing on the one or more DFNs (216A-216N), respectively, that which the CBS (200) services.

In one embodiment of the invention, the API (210) may be a hardware and/or software implemented construct that employs a set of subroutine definitions, protocols, and/or tools for enabling communications and/or information exchange between the CBS (200) and various external entities. These external entities may include, but are not limited to, one or more cluster admin clients (CAC) (212) (see e.g., FIG. 1) and one or more DFNs (214A-214N) that which the CBS (200) may service. Further, the API (210) may include functionality to: receive API requests from these external entities; and transmit API responses, based on processing of the aforementioned API requests, to the appropriate external entities. More specifically, the API (210) may provide a portal through which, for example, the CBS (200) may be configured by a CAC (212), the cluster BCT (204) and the cluster TLT (206) may be populated by information provided by one or more DFNs (214A-214N), UDR snapshots (208) may be provided for consolidation, and instructions may be submitted from the CBS (200) to the one or more DFNs (214A-214N) (i.e., specifically, the cluster backup agent (CBA) (216A-216N) (described below) executing on each DFN (214A-214N)). One of ordinary skill will appreciate that the API (210) may perform other functionalities without departing from the scope of the invention. By way of an example, the API (210) may be a web API that may be accessed through an assigned web address (e.g., a uniform resource locator (URL)) and a wide area network (WAN) (e.g., Internet) connection.

Figure 2B:
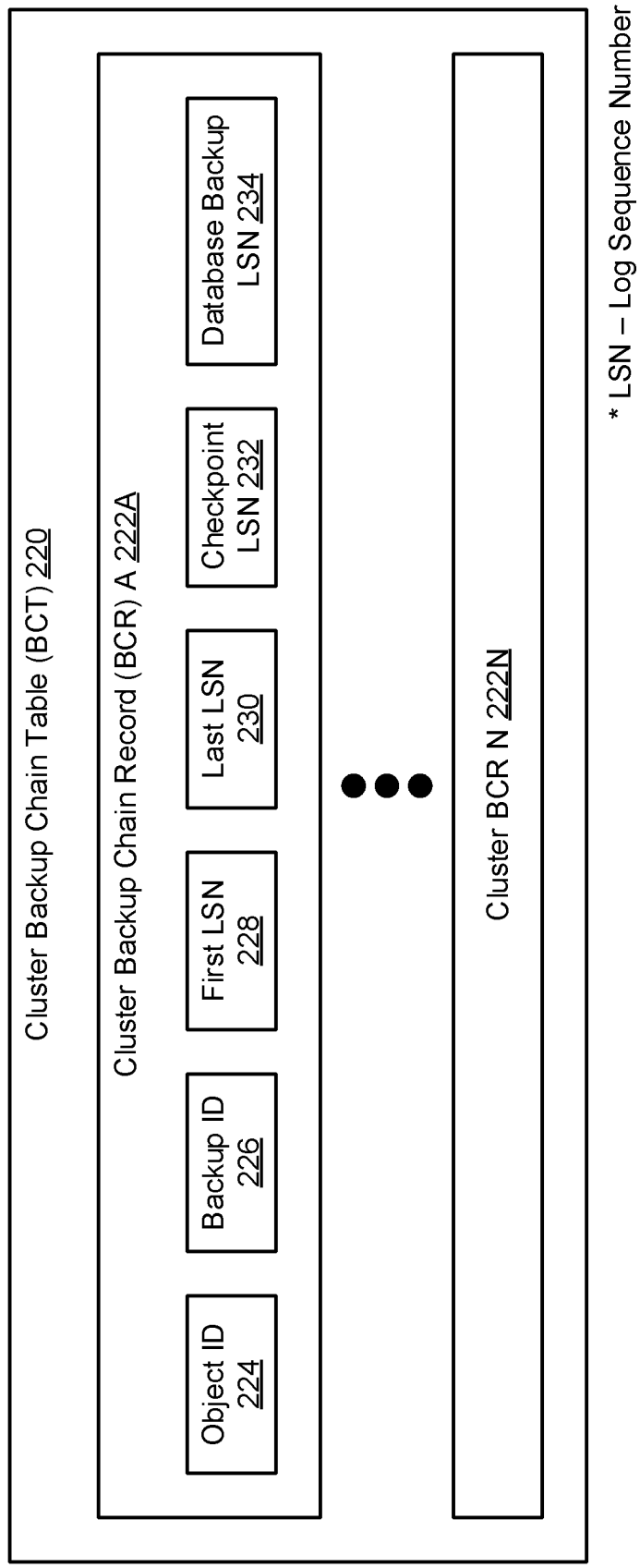
FIG. 2B shows a cluster backup chain table in accordance with one or more embodiments of the invention.

FIG. 2B shows a cluster backup chain table (BCT) in accordance with one or more embodiments of the invention. As described above, the cluster BCT (220) may represent a data object or structure for storing database backup chains pertinent to all databases (i.e., UDRs) across a DAC (see e.g., FIG. 1). Further, the cluster BCT (220) may be maintained, by a kernel of the cluster backup service (CBS) (on which the cluster BCT (220) resides) using changes to one or more database backup chains shared by one or more database failover nodes (DFNs), respectively. In one embodiment of the invention, the cluster BCT (220) may sequence database backups performed across the DAC as one or more cluster backup chain records (BCRs) (222A-222N). Each cluster BCR (222A-222N) may be a data container within which various related items of information reside. These related items of information may include, but are not limited to, an object identifier (ID) (224), a backup ID (226), a first log sequence number (LSN) (228), a last LSN (230), a checkpoint LSN (232), and a database backup LSN (234). Each of these items of information is described below.

In one embodiment of the invention, the object ID (224) may refer to a string of characters (e.g., letters, numbers, symbols, etc.) that may uniquely identify a user database replica (UDR). That is, with each cluster BCR (222A-222N) being directed to a performed and catalogued database backup, the object ID (224) specified therein may identify the UDR of the DAC to which the database backup pertains. Furthermore, the object ID (224) may extend any length and may entail any combination of characters. By way of an example, the object ID (224) may be represented through an alphanumeric tag assigned by a database failover cluster (DFC) (see e.g., FIG. 1) administrator, or a N-bit integer (where N>0) expressed in hexadecimal notation, which may be generated by a logical intelligence (i.e., software) executing on the DFC.

In one embodiment of the invention, the backup ID (226) may refer to a string of characters (e.g., letters, numbers, symbols, etc.) that may uniquely identify a database backup. A database backup, as mentioned above, may entail a full database backup, a differential database backup, or a transaction log backup, which pertains to the UDR of the DAC identified by the object ID (224). Furthermore, the backup ID (226) may extend any length and may entail any combination of characters. By way of an example, the backup ID (226) may be represented through an alphanumeric tag assigned by a DFC administrator, or a N-bit integer (where N>0) expressed in hexadecimal notation, which may be generated by a logical intelligence (i.e., software) executing on the DFC.

In one embodiment of the invention, the first LSN (228) may refer to the LSN of a first transaction captured in the database backup to which the cluster BCR (222A-222N) is directed. As described above, each transaction recorded in the transaction log of a database (i.e., a UDR) may be identified through a unique LSN, where the LSN may represent the offset, in bytes, of the transaction log record (with which the LSN identifies) from the beginning of a database log file. Meanwhile, in one embodiment of the invention, the last LSN (230) may refer to the LSN of a next transaction catalogued (or to be catalogued) after the database backup to which the cluster BCR (222A-222N) is directed. That is, transactions captured in the database backup may be identified by a set of LSNs that begin with the specified first LSN (228) up to, yet excluding, the specified last LSN (230). Moreover, as mentioned above, LSNs are sequential in nature—meaning that a transaction identified through a higher LSN value implies that the transaction occurred at a later point in time. Naturally, the first LSN (228) specified in any cluster BCR (222A-222N) should indicate a lesser value than the last LSN (230) specified in the same cluster BCR (222A-222N).

In one embodiment of the invention, the checkpoint LSN (232) may refer to the LSN of a latest checkpoint captured in the database backup to which the cluster BCR (222A-222N) is directed. A checkpoint may refer to a process, which when triggered, writes any current in-memory dirty data file pages (i.e., pages modified since the previous checkpoint) and transaction log records from a buffer cache to a physical disk. Various types of checkpoints may be supported, including, but not limited to, automatic checkpoints, indirect checkpoints, manual checkpoints, and internal checkpoints, which may be issued as background processes or triggered by DFC administrators, end users, and/or system events. Lastly, in one embodiment of the invention, the database backup LSN (234) may refer to the LSN of the first transaction captured in the latest (or most recently) performed full database backup. Accordingly, the database backup LSN (234) may serve to relate one or more differential database and/or transaction log backups to a full database backup from which the former backups may depend. That is, in cases where a differential database or transaction log backup belong to a particular full database backup, the database backup LSN (234) of the differential database or transaction log backup should match the first LSN (228) and/or the checkpoint LSN (232) of the full database backup. For full database backups, the associated first LSN (228) should match the associated checkpoint LSN (232).

Figure 2C:
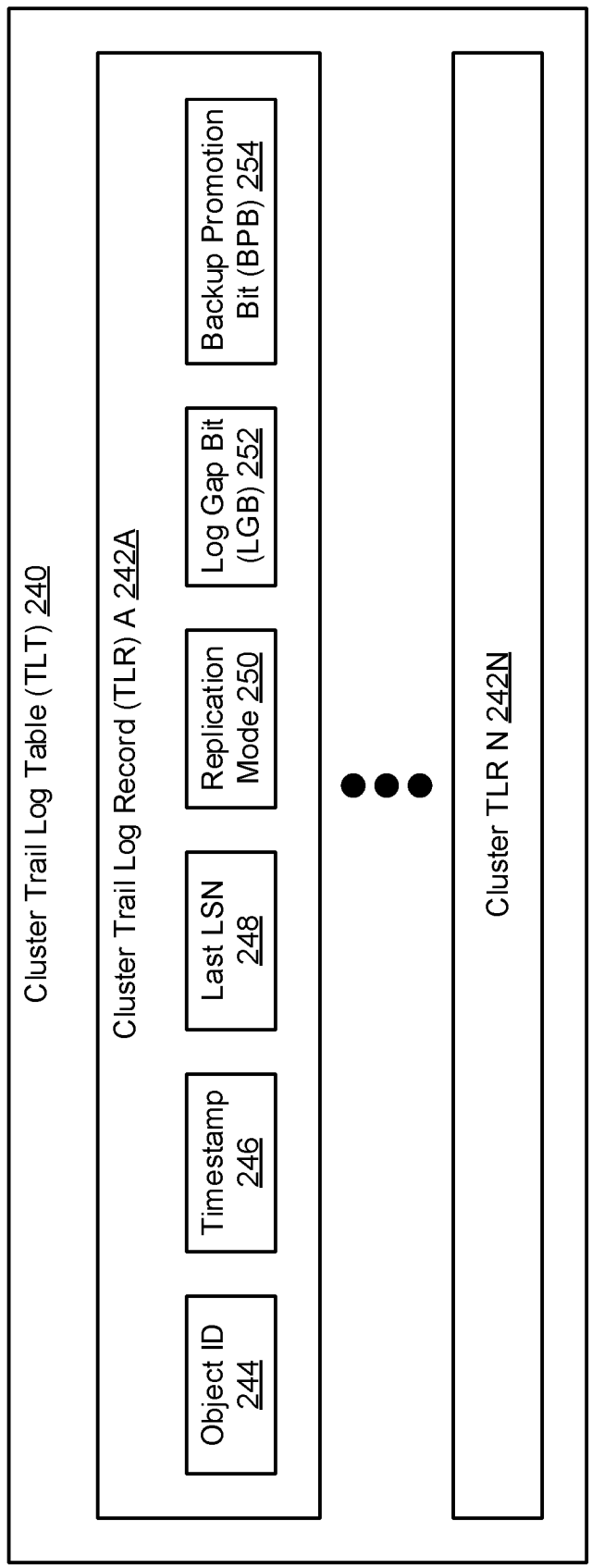
FIG. 2C shows a cluster trail log table in accordance with one or more embodiments of the invention.

FIG. 2C shows a cluster trail log table (TLT) in accordance with one or more embodiments of the invention. As described above, the cluster TLT (240) may represent a data object or structure for tracking the detection of log gaps and ensuing database backup promotions across a database availability cluster (DAC) (see e.g., FIG. 1). Further, the cluster TLT (240) may be maintained, by a kernel of the cluster backup service (CBS) (on which the cluster TLT (240) resides) using information, at least in part, pertinent to log gap detection in accordance with embodiments of the invention (see e.g., FIGS. 5A-5C). Moreover, the cluster TLT (240) may specify one or more cluster trail log records (TLRs) (242A-242N). Each cluster TLR (242A-242N) may be a data container within which various related items of information reside. These related items of information may include, but are not limited to, an object ID (244), a timestamp (246), a last log sequence number (LSN) (248), a replication mode (250), a log gap bit (LGB) (252), and a backup promotion bit (BPB) (254). Each of these items of information is described below.

In one embodiment of the invention, the object ID (244) may refer to a string of characters (e.g., letters, numbers, symbols, etc.) that may uniquely identify a user database replica (UDR). That is, with each cluster TLR (242A-242N) being directed to the processing of a received database backup request (DBR) (described below), the object ID (244) specified therein may identify the UDR of the DAC to which the DBR was directed. Furthermore, the object ID (244) may extend any length and may entail any combination of letters. By way of an example, the object ID (244) may be represented through an alphanumeric tag assigned by a database failover cluster (DFC) (see e.g., FIG. 1) administrator, or a N-bit integer (where N>0) expressed in hexadecimal notation, which may be generated by a logical intelligence (i.e., software) executing on the DFC.

In one embodiment of the invention, the timestamp (246) may refer to a string of characters (e.g., letters, numbers, symbols, etc.) that may encode time information. The encoded time information may pertain to the creation date and/or time of the cluster TLR (242A-242N). By way of an example, the timestamp (246) may encode time information using the following format: MM-DD-YYYY HH:MM:SS, where: (a) MM reserves two characters representing the month that the cluster TLR (242A-242N) was created; (b) DD reserves two characters representing the day that the cluster TLR (242A-242N) was created; (c) YYYY reserves four characters representing the year that the cluster TLR (242A-242N) was created; (d) HH reserves two characters representing the hour that the cluster TLR (242A-242N) was created; (e) MM reserves two characters representing the minute that the cluster TLR (242A-242N) was created; and SS reserves two characters representing the second that the cluster TLR (242A-242N) was created.

In one embodiment of the invention, the last LSN (248) may refer to the LSN of a next transaction catalogued (or to be catalogued) after the current database backup associated with the cluster TLR (242A-242N). Said another way, the last LSN (248) may represent the first LSN (not shown) pertaining to the next database backup.

In one embodiment of the invention, the replication mode (250) may identify the database replication mode (or database availability mode) implemented on the various user databases forming the DAC. The replication mode (250) identifies how information is synchronized between the active (or primary) user database and the one or more passive (or secondary) user databases. By way of an example, the specified replication mode (250) may pertain to an asynchronous-commit mode, which entails the commitment of transactions, by the active/primary user database, without waiting for acknowledgement that the passive/secondary user database(s) have committed the changes to the transaction log. Subsequently, in asynchronous-commit mode, no latency is experienced during the commit process, however, there may be a chance for data loss on failover depending on how far behind the passive/secondary user database(s) are in terms of committing the changes to the transaction log with respect to the active/primary user database. By way of another example, the specified replication mode (250) may pertain to a synchronous-commit mode, which entails the commitment of transactions, by the active/primary user database, only after receiving acknowledgement that the passive/secondary user database(s) have finished committing the changes to the transaction log. In synchronous-commit mode, no data will be lost on failover because the active/primary user database and the passive/secondary user database(s) are synchronized. However, such synchronization may induce some transaction latency.

In one embodiment of the invention, the LGB (252) may refer to a logical or binary value—i.e., either a logical/binary one or a logical/binary zero—that identifies whether a log gap had been detected during the processing of a received database backup request relevant to the cluster TLR (242A-242N). Log gap detection, in accordance with embodiments of the invention, is described in further detail below with respect to FIG. 5C. By way of an example, should the aforementioned processing result in the detection of a log gap, the LGB (252) may be set to a logical/binary one. On the other hand, should the aforementioned processing result in the absence of a log gap, the LGB (252) may be set to a logical/binary zero.

In one embodiment of the invention, the BPB (254) may refer to a logical or binary value—i.e., either a logical/binary one or a logical/binary zero—that identifies whether a backup promotion has been performed as a result of the processing of a received database backup request relevant to the cluster TLR (242A-242N). Database backup promotions serve as a remedy to the detected presence of log gaps in database backup chains, thereby precluding the potential for data loss when a database in the DAC is recovered. By way of an example, should the aforementioned processing result in the promotion of a database backup, the BPB (254) may be set to a logical/binary one. On the other hand, should the aforementioned processing result in the continuance of the requested database backup, without a promotion, the BPB (254) may be set to a logical/binary zero.

Figure 3A:
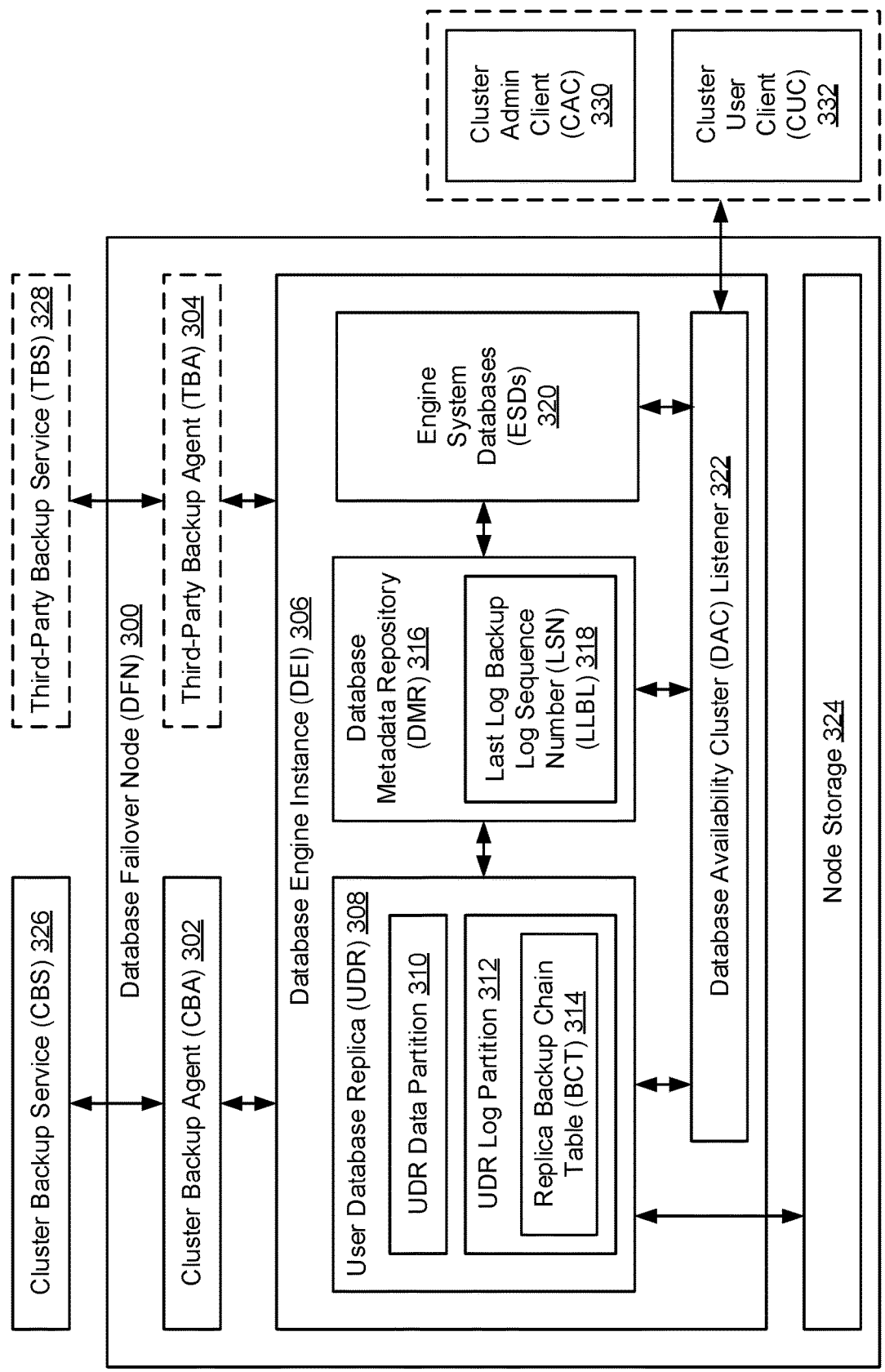
FIG. 3A shows a database failover node in accordance with one or more embodiments of the invention.

FIG. 3A shows a database failover node (DFN) in accordance with one or more embodiments of the invention. Each DFN (300) may be a physical appliance—e.g., a server or any computing system similar to the exemplary computing system shown in FIG. 6—that links with other DFNs (not shown) to form a database failover cluster (DFC) (see e.g., FIG. 1). Further, each DFN (300) may include a cluster backup agent (CBA) (302) or a third-party backup agent (TBA) (304), a database engine instance (DEI) (306), and node storage (324). Each of these components is described below.

In one embodiment of the invention, the cluster backup service (CBS) (326) may service a subset or all DFNs (300) in the DFC. Accordingly, every DFN (300) serviced by the CBS (326) may host a corresponding CBA (302). The CBA (302) may be a computer program or process (i.e., an instance of a computer program) that executes on the underlying hardware of the DFN (300). Specifically, the CBA (302) may be a client computer program or process that works hand-in-hand with the CBS (326). Further, the CBA (302) may include functionality to: receive queries from the CBS (326); in response to the aforementioned queries, communicate database metadata back to the CBS (326); monitor and detect updates to the replica backup chain table (BCT) (314) (described below), which is pertinent to the tracking of database backups performed of the UDR (308); communicate these aforementioned updates to the CBS (326); receive commands from the CBS (326); and process these aforementioned commands to execute full database backups, differential database backups, and/or transaction log backups (described above) of the UDR (308). The CBA (302) may also create database backups based on preset configurations or schedules programmed by a CBS (326) administrator.

In embodiments where the CBS (326) services a subset of the DFNs (300) in the DFC, the remaining DFNs (300) may be serviced by one or more third-party backup services (TBSs) (328). Accordingly, every DFN (300) that may be serviced by a TBS (328) may host a corresponding TBA (304). The TBA (304) may be a computer program or process (i.e., an instance of a computer program) that executes on the underlying hardware of the DFN (300). Specifically, the TBA (304) may be a client computer program or process that works hand-in-hand with a TBS (328). Further, the TBA (304) may include functionality to: create full database backups, differential database backups, and/or transaction log backups (described above) of the UDR (308) based on requests received from a TBS (328). Moreover, one of ordinary skill will appreciate that the TBA (304) may perform other functionalities without departing from the scope of the invention.

In one embodiment of the invention, the DEI (306) may be a computer program or process (i.e., an instance of a computer program) that executes on the underlying hardware of the DFN (300). Specifically, the DEI (306) may be a computer program or process tasked with executing an operating system (OS) service that manages one or more local copies of databases (e.g., the UDR (308), the database metadata repository (DMR) (316), one or more engine system databases (ESDs) (320), etc.) that reside on the DFN (300). Further, the DEI (306) may operate as a service that, at least in part, handles any and all input-output (IO) requests to interact with data and/or metadata in any of the local database copies managed by the DEI (306). By way of an example, the DEI (306) may represent a structured query language (SQL) Server Instance.

In one embodiment of the invention, the DEI (306) may include functionality to mount the UDR (308), which may be hosted on one or more physical devices and/or media that implement at least a portion of the node storage (324). As described above, the UDR (308) may represent a local copy of one or more user databases that may be maintained across the DFC. Substantively, the UDR (308) may be a storage system or media for consolidating various forms of information. The information consolidated in the UDR (308) may be partitioned into a UDR data partition (310) (i.e., disclosed above as a data files segment) or a UDR log partition (312) (i.e., disclosed above as a log files segment). Information residing in the UDR data partition (310) may include, for example, data and objects such as tables, indexes, stored procedures, and views. Further, any information written to the UDR (308), by one or more end users of the DFC, may be retained in the UDR data partition (310). On the other hand, in one embodiment of the invention, information residing in the UDR log partition (312) may include, for example, the transaction log for the UDR (308) (not shown) and a replica BCT (314). The transaction log, again, may refer to a data object or structure that records all transactions, and database changes made by each transaction, pertinent to the UDR (308). Meanwhile, the replica BCT (314) may be another data object or structure that stores the database backup chain for the UDR (308), which is described in further detail below with respect to FIG. 3B.

In one embodiment of the invention, the DEI (306) may include further functionality to mount a database metadata repository (DMR) (316), which may be hosted on one or more physical devices and/or media that implement at least a portion of the node storage (324). The DMR (316) may refer to storage dedicated to consolidating metadata pertaining to one or more user databases (i.e., the UDR (308)) and/or one or more system databases (i.e., the ESDs (320)). The consolidated metadata may refer to information that describes the user and/or system databases (e.g., database ID, database permissions, etc.) and the content or objects stored therein (e.g., object name, object properties, object definitions, etc.). Objects in the databases include, but are not limited to, tables, views, schemas, primary keys, check constraints, stored procedures, data types, etc. In one embodiment of the invention, the DMR (316) may store and track a last log backup LSN (LLBL) (318). The LLBL (318) may refer to a metadata variable that stores the starting (or first) LSN of the next database backup yet to be performed across all UDRs in the database availability cluster (DAC) (see e.g., FIG. 1). That is, the LLBL (318) may store the global last LSN for the latest database backup performed across all UDRs in the DAC.

In one embodiment of the invention, the DEI (306) may include further functionality to mount one or more ESDs (320), which may be hosted on one or more physical devices and/or media that implement at least a portion of the node storage (324). An ESD (320) may refer to a system database that may be fundamental to the operation, maintenance, and/or management of the DEI (306). Examples of ESDs (320) include, but are not limited to: a master system database, which may maintain any system level information for the DEI (306)—e.g., logins, linked servers, endpoints, and other system-wide configuration settings; a model system database, which may maintain templates used in the creation of new user databases; an agent system database, which may maintain configuration and execution history information pertaining to DEI (306) agent jobs, and any information pertaining to all backups and restores; a resources system database, which may maintain system level objects; and a temp system database, which may maintain a workspace for storing temporary objects or intermediate result sets.

In one embodiment of the invention, the DEI (306) may include further functionality to host an instance of the DAC listener (322). As described above, the DAC listener (322) may refer to a logical portal to which clients (e.g., one or more cluster user clients (CUC) (332) and/or one or more cluster admin clients (CAC) (330)) may connect in order to access the various databases and/or repositories (e.g., the UDR (308), the DMR (316), and the ESDs (320)) managed by the DEI (306). To this end, the DAC listener (322) may be associated with a unique domain name service (DNS) name that serves as a virtual network name (VNN), one or more virtual Internet Protocol (VIP) addresses, and a transmission control protocol (TCP) port number. Substantively, a client may use DNS to resolve the VNN into the one or more VIP addresses. Thereafter, the client may attempt to connect to each of the VIP addresses until a connection request succeeds (i.e., thereby granting the client access to one or more of the various databases/repositories) or until the connection requests time out.

Figure 3B:
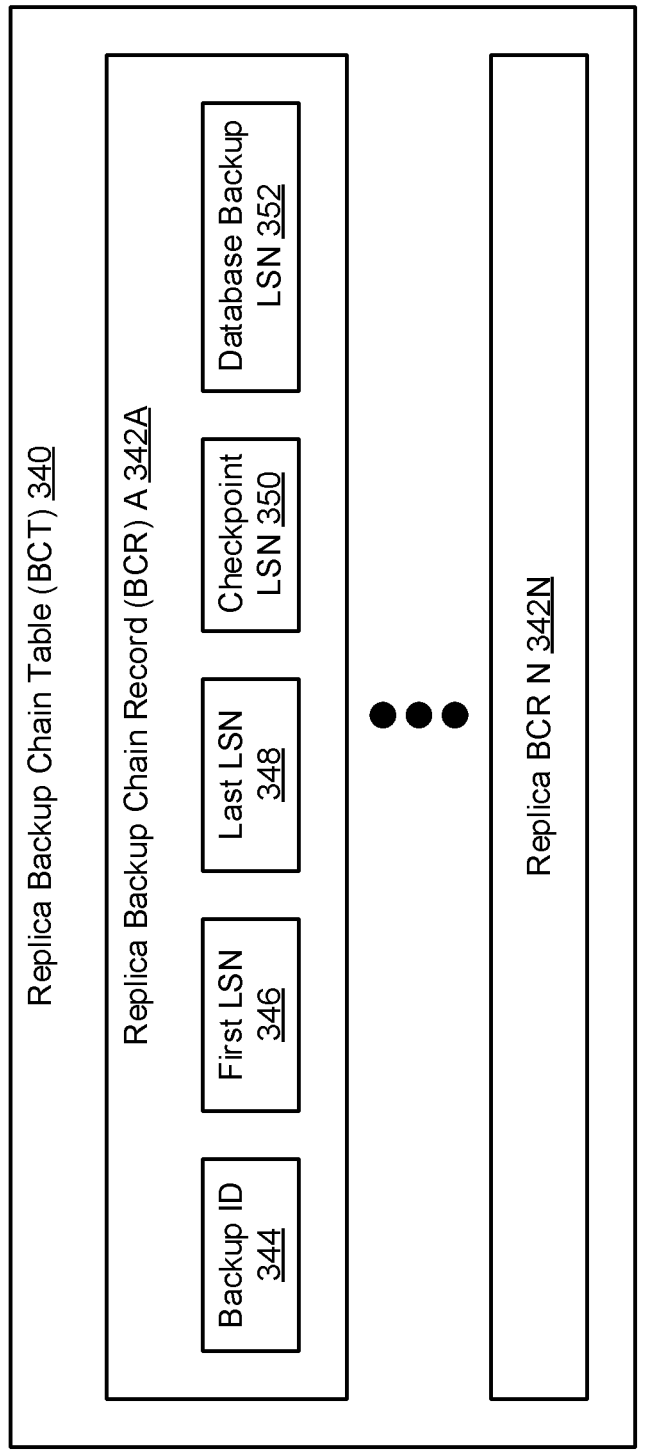
FIG. 3B shows a replica backup chain table in accordance with one or more embodiments of the invention.

FIG. 3B shows a replica backup chain table (BCT) in accordance with one or more embodiments of the invention. The replica BCT (340) may represent a data object or structure for storing the database backup chain pertinent to a given user database replica (UDR) (not shown). As described above, the replica BCT (340) may be stored within a log partition of the UDR. Further, the replica BCT (340) may be maintained, by the UDR itself, thus tracking the proper sequence of full database, differential database, and transaction log backups that may have been performed thereon. Subsequently, in one embodiment of the invention, the replica BCT (340) may sequence database backups performed on a given UDR as one or more replica backup chain records (BCRs) (342A-342N). Each replica BCR (242A-242N) may represent a data container within which various related items of information reside. These related items of information may include, but are not limited to, a backup identifier (ID) (344), a first log sequence number (LSN) (346), a last LSN (348), a checkpoint LSN (350), and a database backup LSN (352). Each of these items of information is described below.

In one embodiment of the invention, the backup ID (344) may refer to a string of characters (e.g., letters, numbers, symbols, etc.) that may uniquely identify a database backup. A database backup may entail a full database backup, a differential database backup, or a transaction log backup. Furthermore, the backup ID (344) may extend any length and may entail any combination of characters. By way of an example, the backup ID (344) may be represented through an alphanumeric tag or a N-bit integer (where N>0) expressed in hexadecimal notation.

In one embodiment of the invention, the first LSN (346) may refer to the LSN of a first transaction captured in the database backup identified by the backup ID (344). As described above, each transaction recorded in the transaction log of a database (i.e., a UDR) may be identified through a unique LSN, where the LSN may represent the offset, in bytes, of the transaction log record (with which the LSN identifies) from the beginning of a database log file. Meanwhile, in one embodiment of the invention, the last LSN (348) may refer to the LSN of a next transaction catalogued (or to be catalogued) after the database backup identified by the backup ID (344). That is, transactions captured in the database backup may be identified by a set of LSNs that begin with the specified first LSN (346) up to, yet excluding, the specified last LSN (348). Moreover, as mentioned above, LSNs are sequential in nature—meaning that a transaction identified through a higher LSN value implies that the transaction occurred at a later point in time. Naturally, the first LSN (346) specified in any replica BCR (342A-342N) should indicate a lesser value than the last LSN (348) specified in the same replica BCR (342A-342N).

In one embodiment of the invention, the checkpoint LSN (350) may refer to the LSN of a latest checkpoint captured in the database backup identified by the backup ID (344). A checkpoint may refer to a process, which when triggered, writes any current in-memory dirty data file pages (i.e., pages modified since the previous checkpoint) and transaction log records from a buffer cache to a physical disk. Various types of checkpoints may be supported, including, but not limited to, automatic checkpoints, indirect checkpoints, manual checkpoints, and internal checkpoints, which may be issued as background processes or triggered by database failover cluster (DFC) administrators, end users, and/or system events. Lastly, in one embodiment of the invention, the database backup LSN (352) may refer to the LSN of the first transaction captured in the latest (or most recently) performed full database backup. Accordingly, the database backup LSN (352) may serve to relate one or more differential database and/or transaction log backups to a full database backup from which the former backups may depend. That is, in cases where a differential database or transaction log backup belong to a particular full database backup, the database backup LSN (352) of the differential database or transaction log backup should match the first LSN (346) and/or the checkpoint LSN (350) of the full database backup. For full database backups, the associated first LSN (346) should match the associated checkpoint LSN (350).

Figure 4A:
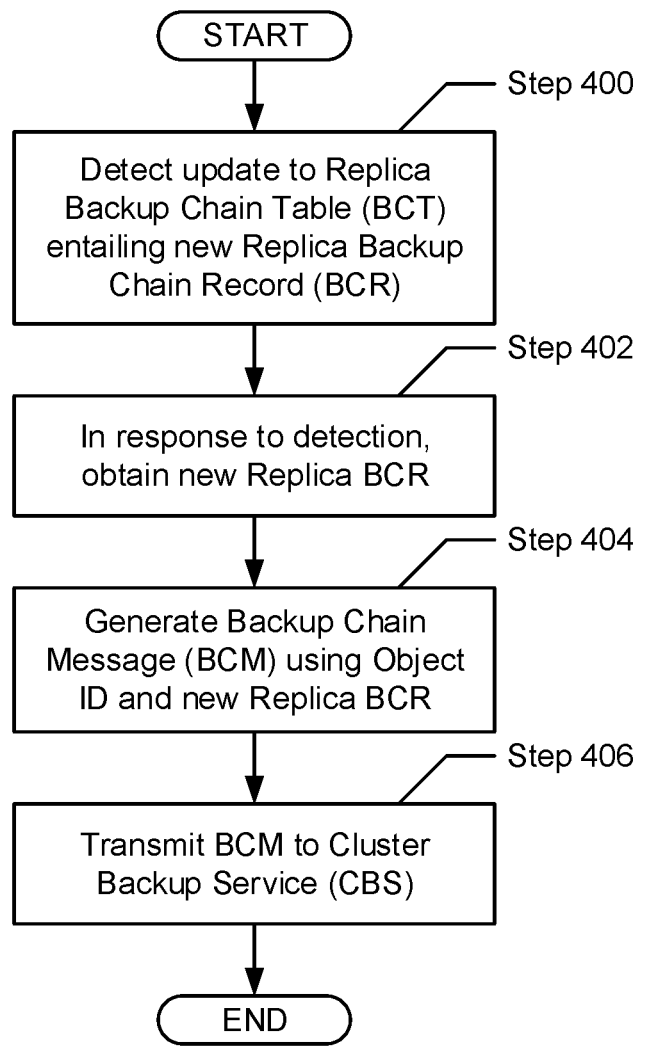
FIG. 4A shows a flowchart describing a method for sharing database backup chain updates in accordance with one or more embodiments of the invention.

FIG. 4A shows a flowchart describing a method for sharing database backup chain updates in accordance with one or more embodiments of the invention. The various steps outlined below may be performed by the cluster backup agent (CBA) residing on an active (or primary) database failover node (DFN) (see e.g., FIG. 3A). Further, while the various steps in the flowchart are presented and described sequentially, one of ordinary skill will appreciate that some or all steps may be executed in different orders, may be combined or omitted, and some or all steps may be executed in parallel.

Turning to FIG. 4A, in Step 400, an update to a replica backup chain table (BCT) (see e.g., FIG. 3B) is detected. In one embodiment of the invention, the update may entail the appendage of a new replica backup chain record (BCR) to the replica BCT. Further, the new replica BCR may store information pertinent to a latest (or most recently) performed full database backup, differential database backup, or transaction log backup of the active (or primary) user database replica (UDR) in the database availability cluster (DAC).

In Step 402, in response to detecting the above-mentioned update (in Step 400), the content of the new replica BCR is obtained from the replica BCT. Thereafter, in Step 404, a backup chain message (BCM) is generated using at least the new replica BCR content (obtained in Step 402). In one embodiment of the invention, the BCM may represent a container and transport for replica backup chain information. Generation of the BCM may further entail including an object identifier (ID) (see e.g., FIG. 2B). The object ID may refer to a string of characters (e.g., letters, numbers, symbols, etc.) that may uniquely identify the active/primary UDR in the DAC. In Step 406, after generating the BCM (in Step 404), the BCM is transmitted to the cluster backup service (CBS).

Figure 4B:
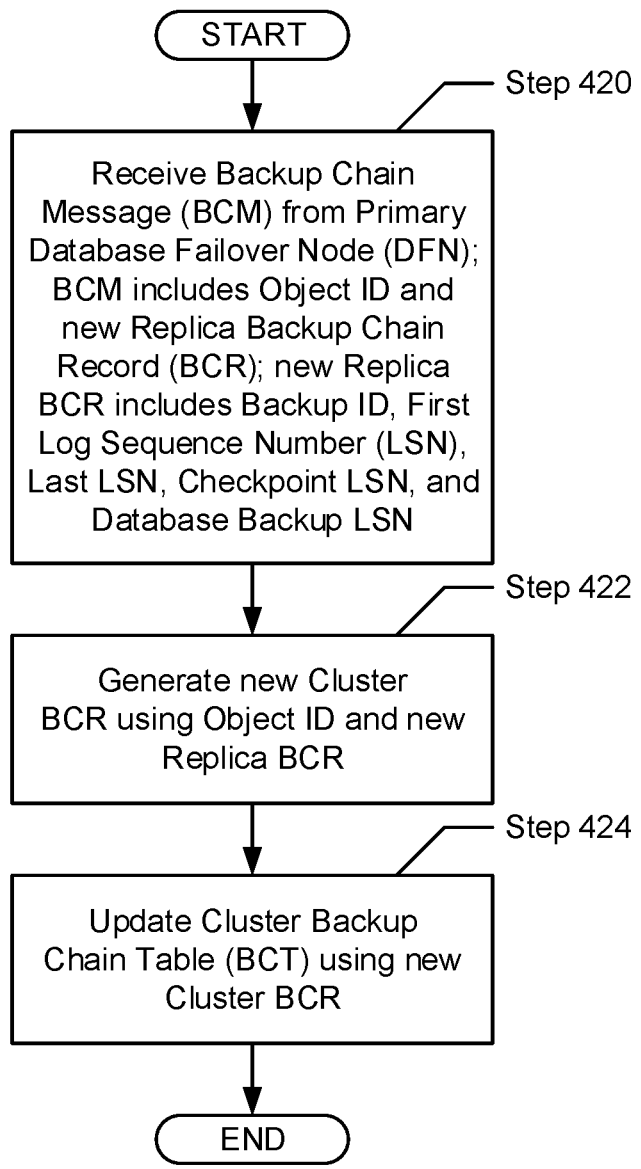
FIG. 4B shows a flowchart describing a method for maintaining cluster-wide database backup chains in accordance with one or more embodiments of the invention.

FIG. 4B shows a flowchart describing a method for maintaining cluster-wide database backup chains in accordance with one or more embodiments of the invention. The various steps outlined below may be performed by the cluster backup service (CBS). Further, while the various steps in the flowchart are presented and described sequentially, one of ordinary skill will appreciate that some or all steps may be executed in different orders, may be combined or omitted, and some or all steps may be executed in parallel.

Turning to FIG. 4B, in Step 420, a backup chain message (BCM) is received. In one embodiment of the invention, the BCM may have been generated and transmitted by a cluster backup agent (CBA) residing on the active (or primary) database failover node (DFN) of the database failover cluster (DFC). Further, the BCM may refer to a container and transport for replica backup chain information. Accordingly, the BCM may include an object ID identifying the active (or primary) user database replica (UDR) at present, and content specified in a new replica backup chain record (BCR) that had been recently appended to a replica backup chain table (BCT) associated with the active/primary UDR. Moreover, content specified in the new replica BCR may include, but is not limited to, a backup ID, a first log sequence number (LSN), a last LSN, a checkpoint LSN, and a database backup LSN. Each of these items of information is described in further detail above with respect to FIG. 3B.

In Step 422, a new cluster BCR is generated. Specifically, in one embodiment of the invention, the new cluster BCR may be generated using replica backup chain information received by way of the BCM (in Step 420). The new cluster BCR may represent a data container that specifies at least the following information: the object ID identifying the active (or primary) UDR at present; the backup ID identifying a latest (or most recently) performed full database backup, differential database backup, or transaction log backup of the active/primary UDR; and a first LSN, a last LSN, a checkpoint LSN, and a database backup LSN—all associated with the aforementioned latest (or most recently) performed database backup. Hereinafter, in Step 424, the cluster backup chain table (BCT) (see e.g., FIG. 2B) is updated using the new cluster BCR (generated in Step 422). More specifically, in one embodiment of the invention, the new cluster BCR may be appended to the cluster BCT, which may reside on the cluster backup service (CBS).

Figure 5A:
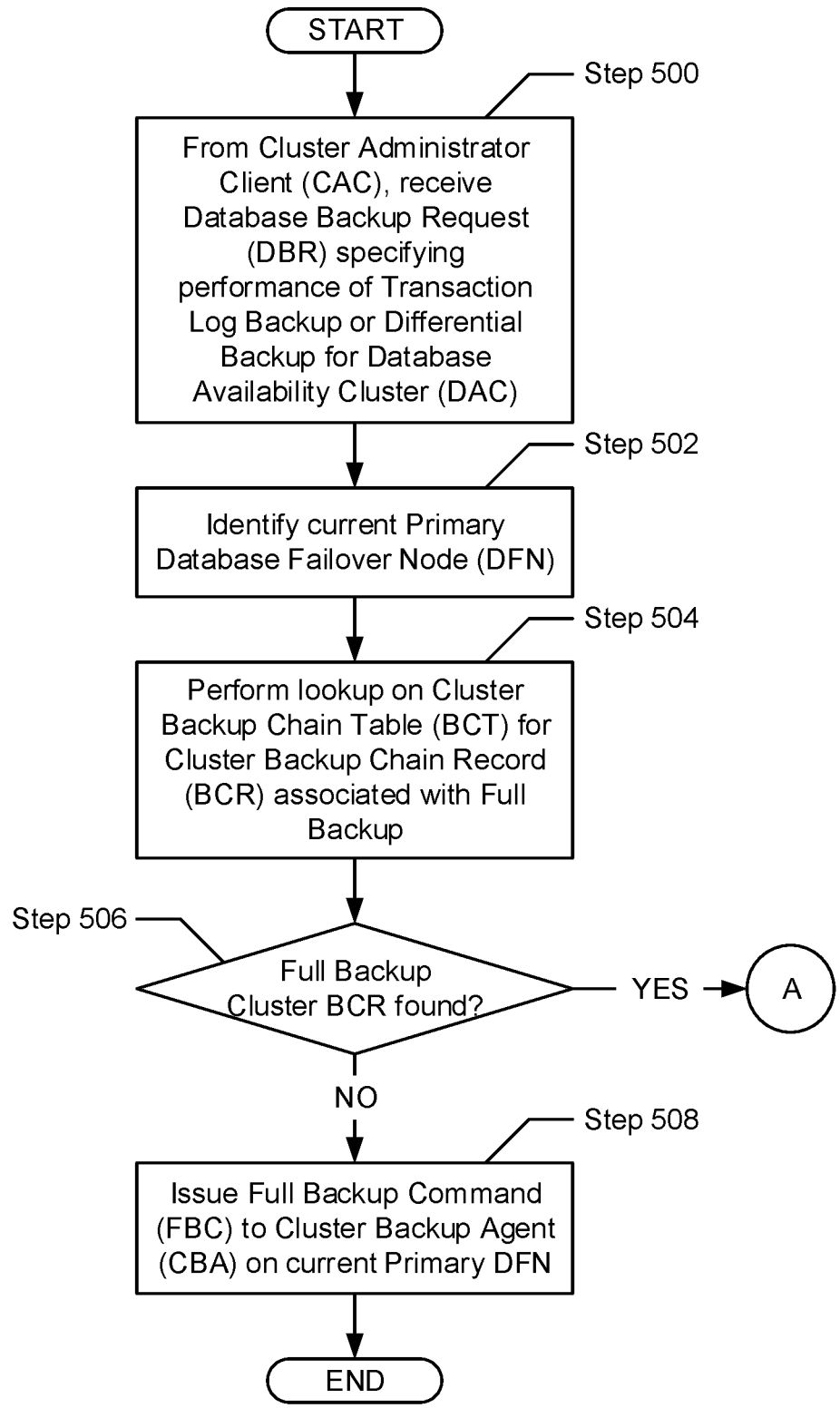
FIGS. 5A-5C show flowcharts describing a method for intelligent log gap detection to prevent unnecessary backup promotion in accordance with one or more embodiments of the invention.
Figure 5B:
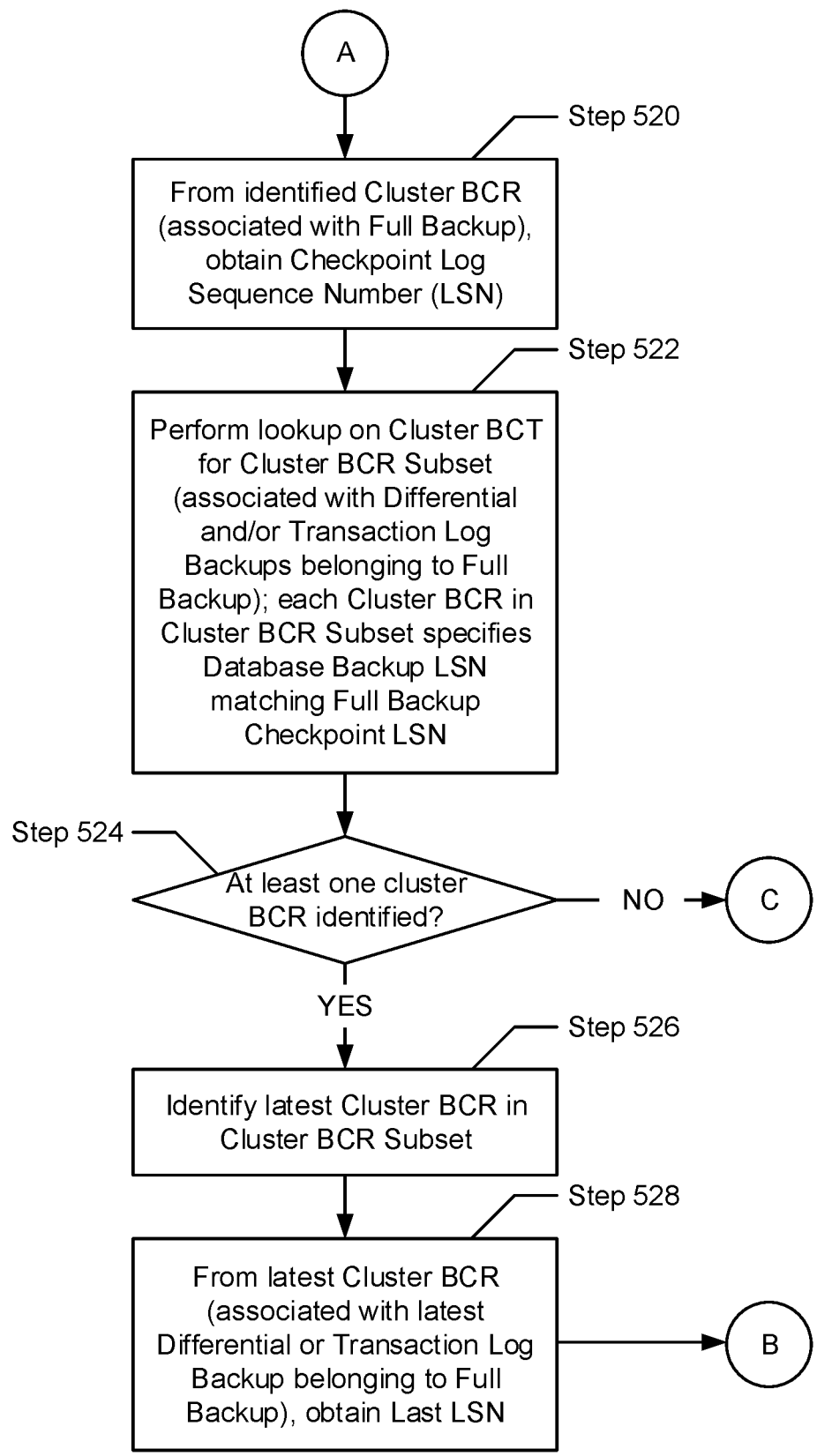
Figure 5C:
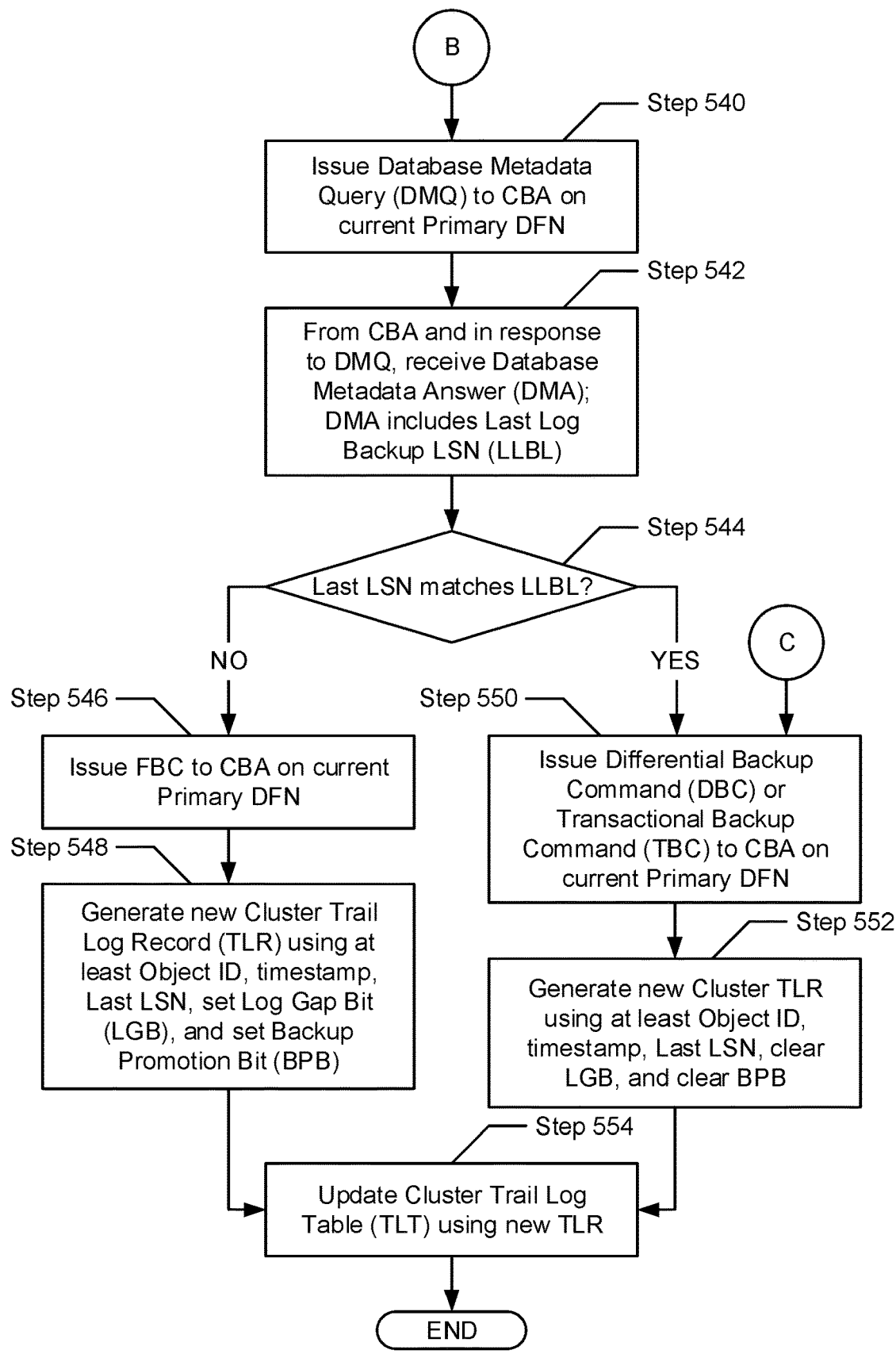

FIGS. 5A-5C show flowcharts describing a method for intelligent log gap detection to prevent unnecessary backup promotion in accordance with one or more embodiments of the invention. The various steps outlined below may be performed by the cluster backup service (CBS). Further, while the various steps in the flowcharts are presented and described sequentially, one of ordinary skill will appreciate that some or all steps may be executed in different orders, may be combined or omitted, and some or all steps may be executed in parallel.

Turning to FIG. 5A, in Step 500, a database backup request (DBR) is received from a cluster admin client (CAC) (see e.g., FIG. 1). In one embodiment of the invention, the DBR may pertain to performing a differential database backup for a database availability cluster (DAC). In another embodiment of the invention, the DBR may alternatively pertain to performing a transaction log backup for the DAC. A DAC may refer to a set of databases that have been configured to failover together. The set of databases may include, at any given time, one active (or primary) user database replica (UDR) and one or more passive (or secondary) UDRs. The active/primary UDR, at one point-in-time, may not necessarily be the same UDR at another point-in-time. That is, at a first point-in-time, a first UDR on a first physical appliance (i.e., a node) may be designated the active/primary UDR. However, at a second point-in-time, because the first physical appliance may have experienced failure, a second UDR on a second physical appliance may become the active/primary UDR in place of the first UDR. In general, the active/primary UDR operates in read-write (RW) mode, whereas the passive/secondary UDR(s) may be maintained in read-only (RO) mode. Accordingly, performing a differential database backup for the DAC translates to performing a differential database backup of the current active/primary UDR at the submission time of the request. Further, a differential database backup may entail replicating all changes made to the active/primary UDR since the last full database backup for the DAC, as well as changes since then made to the transaction log of the active/primary UDR. Similarly, performing a transaction log backup for the DAC translates to performing a transaction log backup of the current active/primary UDR at the submission time of the request. A transaction log backup may entail replicating changes to the transaction log of the active/primary UDR since the last transaction log backup (or the latest full database backup).

In Step 502, the current active (or primary) database failover node (DFN) of the database failover cluster (DFC) (see e.g., FIG. 1) is identified. In one embodiment of the invention, a DFC may refer to a group of linked nodes—i.e., a set of DFNs—that work together to maintain high availability (or minimize downtime) of one or more applications and/or services. The set of DFNs may include, at any given time, one active (or primary) DFN and one or more standby (or secondary) DFNs. The active/primary DFN, at one point-in-time, may not necessarily be the same DFN at another point-in-time. That is, at a first point-in-time, a first DFN may be designated the active/primary DFN. However, at a second point-in-time, because the first DFN may have experienced failure, a second DFN may become the active/primary DFN in place of the first DFN. In one embodiment of the invention, which DFN is the current active/primary DFN of the DFC may be tracked using one or more in-memory data objects or structures residing on the CBS. Accordingly, identification of the current active/primary DFN of the DFC may entail performing a lookup on these one or more in-memory data objects/structures.

In Step 504, a lookup is performed on a cluster backup chain table (BCT) (see e.g., FIG. 2B), which may reside on the CBS. In one embodiment of the invention, the cluster BCT may represent a data object or structure for storing database backup chains pertinent to all UDRs in the DAC. Further, the lookup may be performed to identify a cluster backup chain record (BCR) therein that may be associated with a latest full database backup for the DAC. More specifically, the lookup may entail reviewing each cluster BCR in the cluster BCT in reverse chronological order until a cluster BCR, pertaining to a full database backup, is identified.

In Step 506, based on the lookup on the cluster BCT (performed in Step 504), a determination is made as to whether a cluster BCR, pertaining to a full database backup, has been identified. In one embodiment of the invention, identification pertaining to whether a cluster BCR may associate with a full database backup may entail assessing the backup ID specified therein. A backup ID may refer to a string of characters (e.g., letters, numbers, symbols, etc.) that may uniquely identify a database backup. Further, in one embodiment of the invention, the backup ID for each type of database backup may recite a subset of characters that may uniquely identify each type of database backup. For example, the first character expressed in each backup ID may be hard-fixed to identify the type of database backup—e.g., character 'F' for full database backups, character 'D' for differential database backups, and character 'T' for transaction log backups. Accordingly, if a cluster BCR, pertaining to a full database backup, is identified, then the process proceeds to Step 520 (see e.g., FIG. 5B). On the other hand, if no or zero cluster BCRs are identified as pertaining to a full database backup, then the process alternatively proceeds to Step 508.

In Step 508, after determining (in Step 506) that none of the existing cluster BCRs in the cluster BCT pertain to a full database backup, a full backup command (FBC) is issued. In one embodiment of the invention, the FBC may be directed to a cluster backup agent (CBA) executing on the current active/primary DFN (identified in Step 502), and may instruct the CBA to perform a full database backup of the user database replica (UDR) hosted thereon. That is, substantively, the full database backup is instructed to be performed rather than the differential database backup (requested in Step 500) because of the determined lack of any full database backups logged in the cluster BCT.

With regards to database backup and recovery in general, a full database backup tends to serve as a foundation for any other database backup types—i.e., differential database backups and/or transaction log backups. That is, differential database and transaction log backups are defined through their capture of changes in information consolidated in a database, where recovery of any particular database state that includes these changes requires a base database state—i.e., a full database backup—from which these changes can relate. Accordingly, a backup promotion transpires entailing the promotion of the requested differential database backup to the instructed full database backup, in order to capture that base database state critical to any subsequent database backups performed thereafter.

Turning to FIG. 5B, in Step 520, after determining (in Step 506) that a cluster BCR, pertaining to a full database backup, has been identified, a checkpoint log sequence number (LSN) (specified in the identified cluster BCR) is obtained therefrom. In one embodiment of the invention, the checkpoint LSN may refer to the LSN—i.e., a unique transaction identifier—of a latest checkpoint (described above) captured in the full database backup associated with the identified cluster BCR.

In Step 522, another lookup is performed on the cluster BCT. This time, in one embodiment of the invention, the lookup may be performed to identify a cluster BCR subset, including one or more cluster BCRs associated with a differential database backup or a transaction log backup, which depend from the full database backup (identified via the determination in Step 506). Further, the lookup may entail reviewing the database backup LSN specified in each cluster BCR in the cluster BCT recorded therein following the cluster BCR associated with the aforementioned full database backup. In one embodiment of the invention, the identified cluster BCR subset may include any cluster BCR that specifies a database backup LSN matching the checkpoint LSN (obtained in Step 520).

In Step 524, a determination is made as to whether at least one cluster BCR had been found that specified a database backup LSN matching the checkpoint LSN (obtained in Step 520). In one embodiment of the invention, each cluster BCR meeting the aforementioned criterion infers that the associated database backup depends from the full database backup (identified via the determination in Step 506). Accordingly, if it is determined that at least one cluster BCR has been identified (to form the cluster BCR subset), then the process may proceed to Step 526. On the other hand, if it is alternatively determined that no or zero cluster BCRs have been identified (i.e., signifying no existing database backups are depend from the identified full database backup), then the process may alternatively proceed to Step 550 (see e.g., FIG. 5C).

In Step 526, after determining (in Step 524) that at least one cluster BCR specifies a database backup LSN that matches the checkpoint LSN (obtained in Step 520), a latest cluster BCR is identified. In one embodiment of the invention, the latest cluster BCR may pertain to a latest differential database backup or a latest transaction log backup that depends from the full database backup (identified via the determination in Step 506). By way of an example, identification of the latest cluster BCR may entail comparing the first LSN specified in each cluster BCR of the cluster BCR subset, and identifying the cluster BCR with the highest first LSN as the latest cluster BCR. Recall that LSNs are sequential in nature—meaning that a higher LSN value implies that a corresponding transaction occurred at a later point-in-time.

In Step 528, from the latest cluster BCR (identified in Step 526), a last LSN (specified in the latest cluster BCR) is obtained. In one embodiment of the invention, the last LSN may refer to the LSN—i.e., a unique transaction identifier—of a first transaction that would be captured in a next (or subsequent) database backup following the differential database or transaction log backup associated with the latest cluster BCR.

Turning to FIG. 5C, in Step 540, a database metadata query (DMQ) is issued. In one embodiment of the invention, the DMQ may be directed to the CBA executing on the current active/primary DFN (identified in Step 502), and may instruct the CBA to retrieve and relay back a value for a requested metadata variable. The requested metadata, specified in the DMQ, may be a last log backup LSN (LLBL). The LLBL may refer to a metadata variable that stores the starting (or first) LSN of the next database backup yet to be performed across all UDRs in the DAC. That is, said another way, the LLBL may store the global last LSN for the latest database backup performed across all UDRs in the DAC. Further, the LLBL may be retrieved, by the CBA, from a database metadata repository (DMR) hosted on the current active/primary DFN (see e.g., FIG. 3A). Thereafter, in Step 542, a database metadata answer (DMA) is received in response to the DMQ (issued in Step 540). In one embodiment of the invention, the DMA may represent a result set, to the DMQ, obtained and subsequently forwarded by the CBA of the current active/primary DFN (identified in Step 502). Further, the DMA may specify the LLBL current value retrieved from the DMR.

In Step 544, a determination is made as to whether the last LSN (obtained in Step 526) matches the LLBL (received via the DMA in Step 542). Recall that the last LSN was obtained from within an identified latest cluster BCR depending from a latest full database backup identified in the cluster BCT. Further, in one embodiment of the invention, the cluster BCT represents a data object or structure that maintains all database backup chains for the subset of UDRs in the DAC that may be serviced by the CBS. Subsequently, the cluster BCT may log any and all updates to the database backup chain for the UDR residing on each DFN serviced by the CBS. In contrast, the cluster BCT may not maintain a record of updates to database backup chains pertaining to UDRs that may be serviced by one or more third-party backup services (TBS). The LLBL, on the other hand, represents a metadata variable that stores the global last LSN captured in the latest database backup performed across all UDRs in the DAC—i.e., all UDRs meaning the superset that includes the subset, if not all UDRs, monitored by the CBS and the remaining subset monitored by one or more TBSs, should the CBS only service the aforementioned subset.

Substantively, in one embodiment of the invention, the obtained last LSN and the LLBL should match when the latest database backup, that has transpired across the DAC, had been performed for a UDR on a DFN serviced by the CBS. In such an embodiment, the process may proceed to Step 550. Conversely, in another embodiment of the invention, the obtained last LSN and the LLBL may mismatch when the latest database backup, that has transpired across the DAC, had been performed for a UDR on a DFN serviced by a TBS. Under this embodiment, the process may proceed to Step 546.

In Step 546, based on a determination (in Step 544) that the last LSN mismatches the LLBL, a log gap is detected. In one embodiment of the invention, a log gap may refer to a break in the database backup chain for a database or, alternatively, for a set of databases such as the DAC. A break in the database backup chain may certainly lead to data loss should a differential database backup or a transaction log backup be pursued hereinafter. Subsequently, as a measure to protect against such data loss, a full database backup must transpire. Accordingly, a FBC is issued, thereby promoting the differential database backup or transaction log backup (requested in Step 500) to a full database backup. In one embodiment of the invention, the FBC may be directed to the CBA of the current active/primary DFN (identified in Step 502), and may instruct the CBA to perform the aforementioned full database backup of the UDR hosted thereon.

In Step 548, following issuance of the FBC (in Step 546), a new cluster trail log record (TLR) (see e.g., FIG. 2C) is generated. Specifically, in one embodiment of the invention, the new cluster TLR may be generated using the following information: (a) an object ID uniquely identifying the UDR residing on the current active/primary DFN (identified in Step 502); (b) a timestamp encoding time information that indicates the creation date and/or time of the new cluster TLR; (c) the last LSN (obtained in Step 526); (d) a logical or binary one representative of a log gap bit (LGB), which specifies that a log gap has been detected; and (e) another logical/binary one representative of a backup promotion bit (BPB), which specifies that a backup promotion has occurred.

In Step 550, based on an alternate determination (in Step 544) that the last LSN matches the LLBL, there exists no break in the above-mentioned database backup chain. In one embodiment of the invention, without a break, there is no risk for data loss should the differential database backup or transaction log backup (requested in Step 500) take place. Accordingly, in one embodiment of the invention, a differential backup command (DBC) is issued if a differential database backup had been requested in Step 500. In another embodiment of the invention, a transaction backup command (TBC) is issued if a transaction log backup had been alternatively requested in Step 500. Further, the DBC or TBC may be directed to the CBA of the current active/primary DFN (identified in Step 502), and may instruct the CBA to perform the requested differential database backup (or the requested transaction log backup) of the UDR hosted thereon. In one embodiment of the invention, Step 550 may also be reached after determining (in Step 524) that existing no/zero cluster BCRs have been identified as specifying database backup LSNs that match the checkpoint LSN (obtained in Step 520).

In Step 552, following issuance of the DBC or TBC (in Step 550), a new cluster TLR (see e.g., FIG. 2C) is generated. Specifically, in one embodiment of the invention, the new cluster TLR may be generated using the following information: (a) an object ID uniquely identifying the UDR residing on the current active/primary DFN (identified in Step 502); (b) a timestamp encoding time information that indicates the creation date and/or time of the new cluster TLR; (c) the last LSN (obtained in Step 526); (d) a logical or binary zero representative of a LGB, which specifies that a log gap has not been detected; and (e) another logical/binary zero representative of a BPB, which specifies that a backup promotion has not occurred.

In Step 554, following the generation of the new cluster TLR (in Step 548 or Step 552), the cluster trail log table (TLT) (see e.g., FIG. 2C) is updated using the new cluster TLR. More specifically, in one embodiment of the invention, the new cluster TLR may be appended to the cluster TLT, which may reside on the cluster backup service (CBS).

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention relate to intelligent log gap detection to prevent unnecessary backup promotion. When promoted, database backups tend to generate full copies of the current state of a database, which when consolidated, occupy a substantially large amount of storage space (e.g., within the terabytes (TB) range or more). Further, embodiments of the invention assess when full database backups across high availability databases are necessary and, if not, pursues either differential or transaction log database backups in order to save storage space available in the backup storage system (e.g., the cluster backup service (CBS)). Differential and/or transaction log database backups conversely occupy far less amounts, respectively, of storage space (e.g., within the megabytes (MB) range).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for intelligent log gap detection, comprising:
   receiving a first database backup request for a first database backup on a database availability cluster (DAC);
   making a first determination that a first full database backup has already been performed;
   obtaining, based on the first determination, a checkpoint log sequence number (LSN) associated with the first full database backup;
   identifying a second database backup that depends from the first full database backup;
   identifying a latest database backup from the second database backup;
   obtaining a last LSN associated with the latest database backup;
   making a second determination that the last LSN mismatches a first last log backup LSN (LLBL);
   detecting, based on the second determination, a log gap across the DAC;
   promoting, based on detecting the log gap, the first database backup to a second full database backup;
   based on the promoting:
      issuing a full backup command (FBC);
      generating a new cluster trail log record (TLR) using an object ID identifying an active database of the DAC, a timestamp, the last LSN, a set log gap bit (LGB), and a set backup promotion bit (BPB); and
      updating a cluster trail log table (TLT) using the new cluster TLR.

2. The method of claim 1, wherein the first database backup is one selected from a group consisting of a first differential database backup and a first transaction log backup.

3. The method of claim 1, wherein identifying the second database backup, comprises:
   performing a search on a cluster backup chain table (BCT) in reverse chronological order, wherein the cluster BCT comprises a plurality of cluster backup chain records (BCRs); and
   identifying one cluster BCR of the plurality of cluster BCRs based on a database backup LSN specified in the one cluster BCR matching the checkpoint LSN.

4. The method of claim 1, wherein after promoting the first database backup and before generating the new cluster TLR, the method further comprises:
   receiving a second database backup request for a third database backup on the DAC;
   making a third determination that the last LSN matches a second LLBL;
   detecting, based on the third determination, no log gap across the DAC; and
   issuing, based on detecting no log gap, one selected from a group consisting of a differential backup command (DBC) and a transaction backup command (TBC).

5. A system, comprising:
   a cluster backup agent (CBA); and
   a cluster backup service (CBS) operatively connected to the CBA, programmed to:
      receive a database backup request for a first database backup on a database availability cluster (DAC);
      make a first determination that a first full database backup has already been performed;
      obtain, based on the first determination, a checkpoint log sequence number (LSN) associated with the first full database backup;
      identify a second database backup that depends from the first full database backup;
      identify a latest database backup from the second database backup;
      obtain a last LSN associated with the latest database backup;

make a second determination that the last LSN mismatches a last log backup LSN (LLBL); a detect, based on the second determination, a log gap across the DAC;

promote, based on detecting the log gap, the first database backup to a second full database backup;

based on the promoting:
 issue a full backup command (FBC) to the CBA;
 generate a new cluster trail log record (TLR) using an object ID identifying an active database of the DAC, a timestamp, the last LSN, a set log gap bit (LGB), and a set backup promotion bit (BPB); and
 update a cluster trail log table (TLT) using the new cluster TLR.

6. The system of claim 5, further comprising:
a first user database replica (UDR) operatively connected to the CBA,
wherein the CBA is programmed to:
 create, in response to the FBC, the second full database backup of the first UDR.

7. The system of claim 6, further comprising:
a database engine instance (DEI) comprising the first UDR, a database metadata repository (DMR), and an engine system database (ESD),
wherein the DMR comprises the LLBL.

8. The system of claim 7, further comprising:
a database failover cluster (DFC) comprising a plurality of database failover nodes (DFNs) and the DAC,
wherein the DAC comprises a plurality of UDRs comprising the first UDR,
wherein a DFN of the plurality of DFNs comprises the CBS and the DEI.

9. The system of claim 5, further comprising:
a cluster admin client (CAC) operatively connected to the CBS,
wherein the database backup request is submitted by the CAC.

10. A non-transitory computer readable medium (CRM) comprising computer readable program code, which when executed by a computer processor, enables the computer processor to:
 receive a first database backup request for a first database backup on a database availability cluster (DAC);
 make a first determination that a first full database backup has already been performed;
 obtain, based on the first determination, a checkpoint log sequence number (LSN) associated with the first full database backup;
 identify a second database backup that depends from the first full database backup;
 identify a latest database backup from the second database backup;
 obtain a last LSN associated with the latest database backup;
 make a second determination that the last LSN mismatches a last log backup LSN (LLBL);
 detect, based on the second determination, a log gap across the DAC;
 promote, based on detecting the log gap, the first database backup to a second full database backup;
 based on the promoting:
  issue a full backup command (FBC);
  generate a new cluster trail log record (TLR) using an object ID identifying an active database of the DAC, a timestamp, the last LSN, a set log gap bit (LGB), and a set backup promotion bit (BPB); and
  update a cluster trail log table (TLT) using the new cluster TLR.

11. The non-transitory CRM of claim 10, wherein the first database backup is one selected from a group consisting of a first differential database backup and a first transaction log backup.

12. The non-transitory CRM of claim 10, wherein to identify the second database backup, the computer readable program code, which when executed by the computer processor, enables the computer processor to:
 perform a search on a cluster backup chain table (BCT) in reverse chronological order, wherein the cluster BCT comprises a plurality of cluster backup chain records (BCRs); and
 identify a cluster BCR of the plurality of cluster BCRs based on a database backup LSN specified in the cluster BCR matching the checkpoint LSN.

13. The non-transitory CRM of claim 10, wherein the computer readable program code, when executed by the computer processor, further enables the computer processor to:
 after promoting the first database backup and before generating the new cluster TLR:
  receive a second database backup request for a third database backup on the DAC;
  make a third determination that the last LSN matches a second LLBL;
  detect, based on the third determination, no log gap across the DAC; and
  issue, based on detecting no log gap, one selected from a group consisting of a differential backup command (DBC) and a transaction backup command (TBC).

* * * * *